(12) United States Patent
Park et al.

(10) Patent No.: US 7,312,948 B2
(45) Date of Patent: Dec. 25, 2007

(54) CASSETTE TAPE EJECTING APPARATUS, AND MAGNETIC RECORDING/REPRODUCING APPARATUS HAVING THE SAME

(75) Inventors: Byeng-Bae Park, Aansan-si (KR); Jun-Young Kim, Suwon-si (KR); Jeong-Hyeob Oh, Anyang-si (KR); Jae-Hoon Sim, Suwon-si (KR); Seung-Woo Lee, Suwon-si (KR); Hyeong-Seok Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 381 days.

(21) Appl. No.: 11/061,521

(22) Filed: Feb. 22, 2005

(65) Prior Publication Data

US 2005/0280930 A1    Dec. 22, 2005

(30) Foreign Application Priority Data

Jun. 19, 2004    (KR) .................... 10-2004-0045821

(51) Int. Cl.
*G11B 15/00*    (2006.01)
(52) U.S. Cl. .................................... 360/96.5
(58) Field of Classification Search ................ 360/96.5
See application file for complete search history.

(56) References Cited

U.S. PATENT DOCUMENTS

| | | | |
|---|---|---|---|
| 5,038,236 A | 8/1991 | Nakahara et al. ......... 360/96.5 |
| 6,038,100 A * | 3/2000 | Nagatsuka ................. 360/96.6 |
| 6,643,092 B2 * | 11/2003 | Sawai et al. ............... 360/96.5 |
| 6,865,054 B2 * | 3/2005 | Sawai ........................ 360/96.5 |
| 2001/0012173 A1 | 8/2001 | Kumagai | |
| 2004/0109260 A1 * | 6/2004 | Kim et al. ................. 360/96.5 |

FOREIGN PATENT DOCUMENTS

| | | |
|---|---|---|
| JP | 02-148456 | 6/1990 |
| KR | 1997-0003499 | 4/1997 |
| KR | 20-0136629 | 5/1999 |
| KR | 20-0187925 | 7/2000 |

* cited by examiner

*Primary Examiner*—A. J. Heinz
*Assistant Examiner*—Mark Blouin
(74) *Attorney, Agent, or Firm*—Roylance, Abrams, Berdo & Goodman, LLP

(57) ABSTRACT

A cassette tape ejecting apparatus has a chassis having a pin boss, a hook hole and a locking groove formed as a single body, a cassette housing installed on the chassis to be transferred to a tape insertion position and a tape ejection position, a cassette tape being mounted thereon, a locking lever being installed on the cassette housing, and having a locking protrusion hooked on the looking groove of the chassis when the cassette housing is transferred to the tape insertion position, an eject lever installed on the chassis to be rotated through the pin boss of the chassis in the forward/backward direction unlocks the locking protrusion from the locking groove of the chassis to eject the cassette tape, and a cassette switch turned on/off by the forward/backward rotation of the eject lever, for detecting ejection of the cassette tape.

10 Claims, 5 Drawing Sheets

CASSETTE TAPE EJECTING APPARATUS, AND MAGNETIC RECORDING/REPRODUCING APPARATUS HAVING THE SAME

CROSS-REFERENCE TO RELATED APPLICATIONS

This application claims benefit under 35 U.S.C. §119(a) from Korean Patent Application No. 2004-45821, filed in the Korean Intellectual Property Office on Jun. 19, 2004, the entire content of which is incorporated herein by reference.

BACKGROUND OF THE INVENTION

1. Field of the Invention

The present invention relates to a magnetic recording/reproducing apparatus. More particularly, the present invention relates to an improved cassette tape ejecting apparatus, and a magnetic recording/reproducing apparatus having the same.

2. Description of the Related Art

A magnetic recording/reproducing apparatus using a magnetic tape as a recording medium, for example, a video cassette tape recorder (VCR) or a digital versatile camcorder (DVC) includes a deck for recording and/or reproducing information by accepting the tape in the cassette tape, running the tape, and ejecting the tape, a photographing portion, and a signal processing portion.

Referring to FIG. 1, the deck of the conventional magnetic recording/reproducing apparatus includes a main chassis 10, a sub chassis 20 slidably installed on the main chassis 10, and a cassette housing 30 movably installed on the sub chassis 20, a cassette tape C being mounted thereon.

A head drum 11, a loading motor 12, a capstan motor 13 and a plurality of guide rollers 14 and guide poles 15 composing a tape running system are disposed on the main chassis 10. A pair of reel tables 21 and 22 for driving tape reels (not shown) of the cassette tape C are disposed on the sub chassis 20.

The cassette housing 30 can be transferred to a tape insertion position and a tape ejection position. The deck of the magnetic recording/reproducing apparatus includes a cassette tape ejecting apparatus 40 (refer to FIGS. 2A and 2B) for locking the cassette housing 30 on the sub chassis 20 in the tape insertion position, and unlocking the cassette housing 30 and transferring the cassette housing 30 to the tape ejection position to eject the cassette tape C.

As illustrated in FIGS. 1, 2A and 2B, the cassette tape ejecting apparatus 40 includes a locking lever 41 installed on the cassette housing 30, an eject lever 43 installed on the sub chassis 20, and a cassette switch 45.

The locking lever 41 has a locking protrusion 41a and an unlocking protrusion 41b. When the cassette housing 30 is transferred to the tape insertion position, the locking protrusion 41a is hooked on a locking groove 20a formed on the sub chassis 20.

The eject lever 43 is installed on the sub chassis 20 to be rotated by a pin 42 in the forward/backward direction at a predetermined angle. The eject lever 43 includes an operation portion 43a contacting the unlocking protrusion 41b of the locking lever 41, a pressing portion 43b and an elastic portion 43c. A washer 44 for preventing separation of the eject lever 43 is coupled onto the pin 42.

The cassette switch 45 is installed at one side of the sub chassis 20 to be turned on/off by the forward/backward rotation of the eject lever 43.

In the cassette tape ejecting apparatus 40, when the cassette housing 30 on which the cassette tape C has been mounted is transferred to the tape insertion position, the locking protrusion 41a of the locking lever 41 of the cassette housing 30 is hooked on the locking groove 20a of the sub chassis 20, thereby locking the cassette housing 30. Here, the pressing portion 43b of the eject lever 43 presses a contact point of the cassette switch 45, to switch the cassette switch 45 to the "On" position.

On the other hand, when the user presses an eject button (not shown) to eject the cassette tape C, the eject lever 43 is rotated in the counterclockwise direction seen from the drawing (arrow direction of FIG. 2a) to push the unlocking protrusion 41b of the locking lever 41, thereby unlocking the locking protrusion 41a. Accordingly, the cassette housing 30 is unlocked and transferred to the tape ejection position. Here, the cassette switch 45 is separated from the pressing portion 43b of the eject lever 43, and thus is switched to the "Off" position.

However, the general cassette tape ejecting apparatus of the magnetic recording/reproducing apparatus requires subsidiary materials such as the pin 42 for coupling the eject lever 43 to the chassis 20, and the washer 44 for preventing separation of the eject lever 43, which inevitably increases the number of assembly components and the number of assembly process steps resulting in lower productivity and higher costs.

SUMMARY OF THE INVENTION

The present invention is achieved to solve the above problems. One object of the present invention is to provide a cassette tape ejecting apparatus which can couple an eject lever to a chassis to be fully operated without using subsidiary materials such as a pin and a washer, and a magnetic recording/reproducing apparatus having the same.

In order to achieve the aforementioned object of the present invention, there is provided a cassette tape ejecting apparatus of a magnetic recording/reproducing apparatus, comprising a chassis having a pin boss, a hook hole and a locking groove, which are formed as a single body; a cassette housing installed on the chassis to be transferred to a tape insertion position and a tape ejection position, a cassette tape being mounted thereon; a locking lever being installed on the cassette housing, and having a locking protrusion hooked on the locking groove when the cassette housing is transferred to the tape insertion position; and an eject lever installed on the chassis to be rotated through the pin boss in the forward/backward direction at a predetermined angle, for unlocking the locking protrusion from the locking groove to eject the cassette tape.

According to one aspect of the present invention, the cassette tape ejecting apparatus of the magnetic recording/reproducing apparatus comprises a cassette switch turned on/off by the forward/backward rotation, respectively, of the eject lever, for detecting the ejection of the cassette tape.

The locking lever comprises an unlocking protrusion contacting the eject lever. The eject lever comprises a body having a pin hole for housing the pin boss, an operation portion contacting the unlocking protrusion of the locking lever, and a pressing portion for operating the cassette switch.

The pressing portion is elastically biased with respect to the body, and thus buffers any excessive external force and efficiently operates a contact point of the cassette switch.

Preferably, the eject lever comprises a hook portion hooked on the hook hole of the chassis, for preventing separation.

The pin boss is preferably incorporated with the chassis by a deep-drawing process.

The cassette switch preferably is installed on the bottom surface of the chassis.

In addition, there is provided a magnetic recording/reproducing apparatus comprising a chassis for supporting reel tables, a tape running system and a head drum; a cassette housing installed on the chassis to be transferred to a tape insertion position and a tape ejection position, a cassette tape being mounted thereon; and a cassette tape ejecting apparatus for locking the cassette housing on the chassis when the cassette housing is transferred to the tape insertion position, and unlocking the cassette housing and transferring the cassette housing to the tape ejection position to eject the cassette tape, wherein the cassette tape ejecting apparatus comprises the chassis having a pin boss, a hook hole and a locking groove which are formed in a single body; a locking lever being installed on the cassette housing, and having a locking protrusion hooked on the locking groove when the cassette housing is transferred to the tape insertion position, and an unlocking protrusion; an eject lever installed on the chassis to be rotated through the pin boss in the forward/backward direction at a predetermined angle, for unlocking the locking protrusion from the locking groove to eject the cassette tape; and a cassette switch turned on/off by the forward/backward rotation of the eject lever, for sensing ejection of the cassette tape.

BRIEF DESCRIPTION OF THE DRAWINGS

The above aspects and features of the present invention will be more apparent by describing certain embodiments of the present invention with reference to the accompanying drawings, in which.

Throughout the drawings, it should be understood that like reference numerals refer to similar features, elements and structures.

DETAILED DESCRIPTION OF EXEMPLARY EMBODIMENTS

Certain embodiments of the present invention will be described in greater detail with reference to the accompanying drawings.

The matters defined in the description such as a detailed construction and elements are provided to assist in a comprehensive understanding of the invention. The description of well-known functions or constructions is omitted for the sake of clarity and conciseness.

Figure 1:
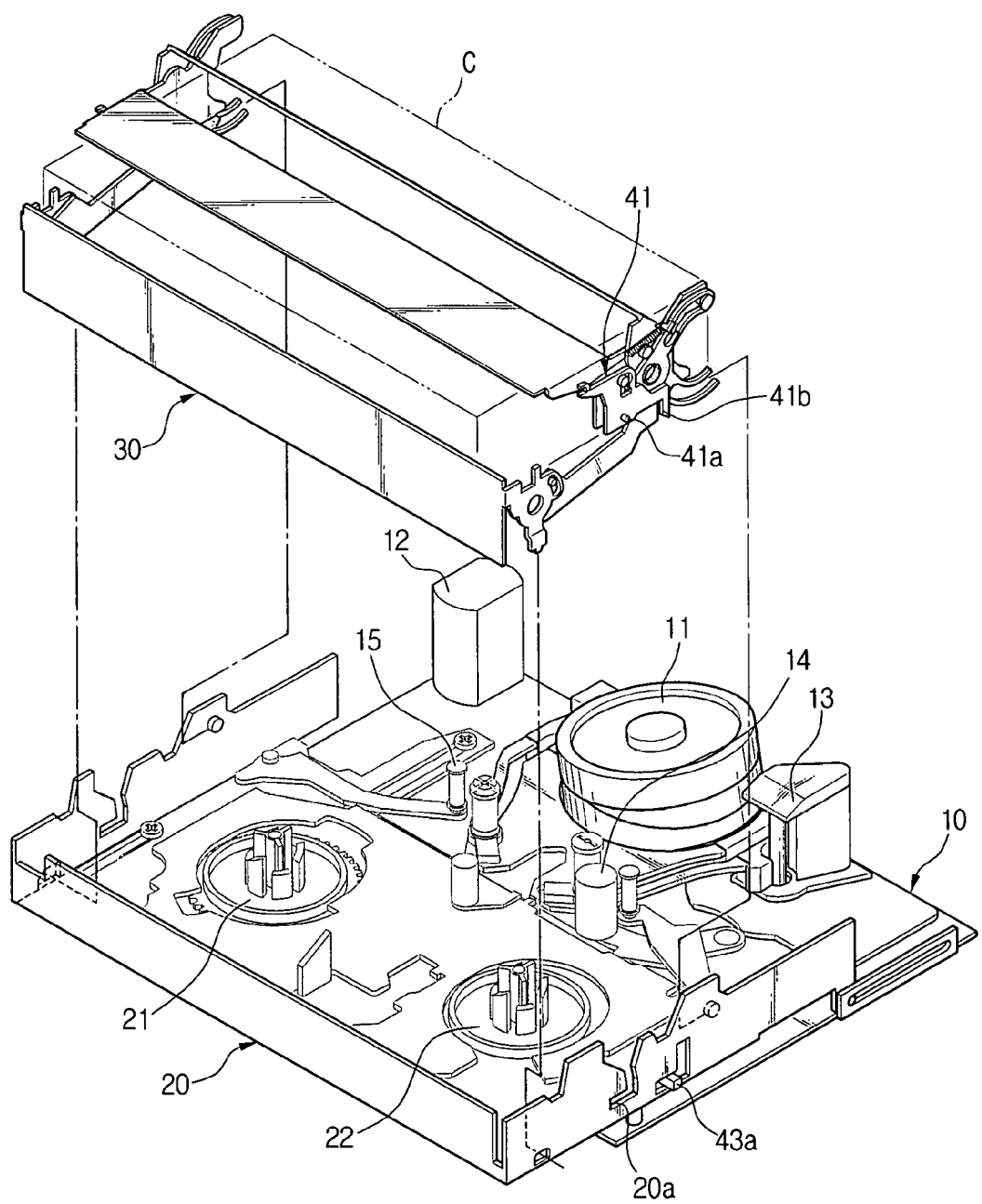
FIG. 1 is a schematic perspective view of a deck of a conventional magnetic recording/reproducing apparatus.
Figure 2A:
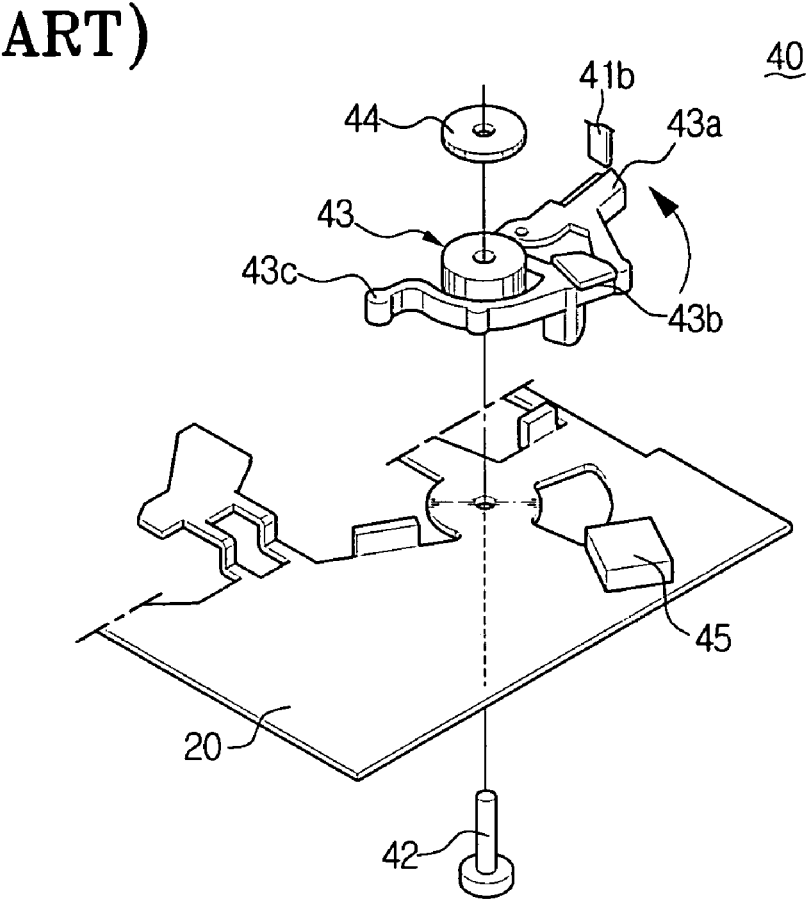
FIGS. 2a and 2b are an exploded perspective view and an assembly cross-sectional view of the structure and operation of a cassette tape ejecting apparatus installed on the deck of FIG. 1, respectively.
Figure 2B:
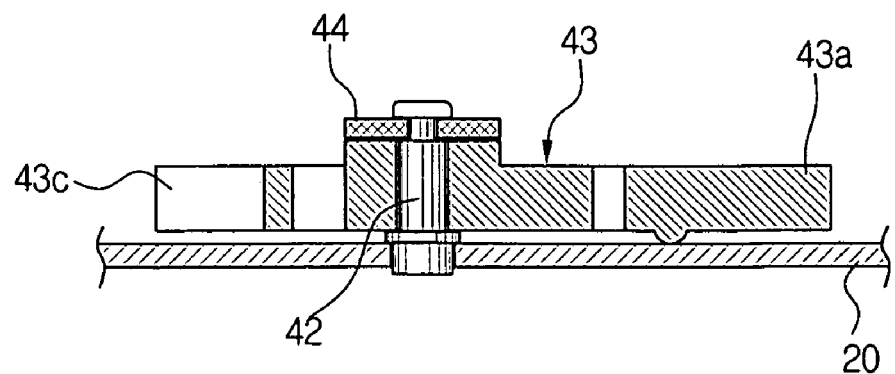
Figure 3:
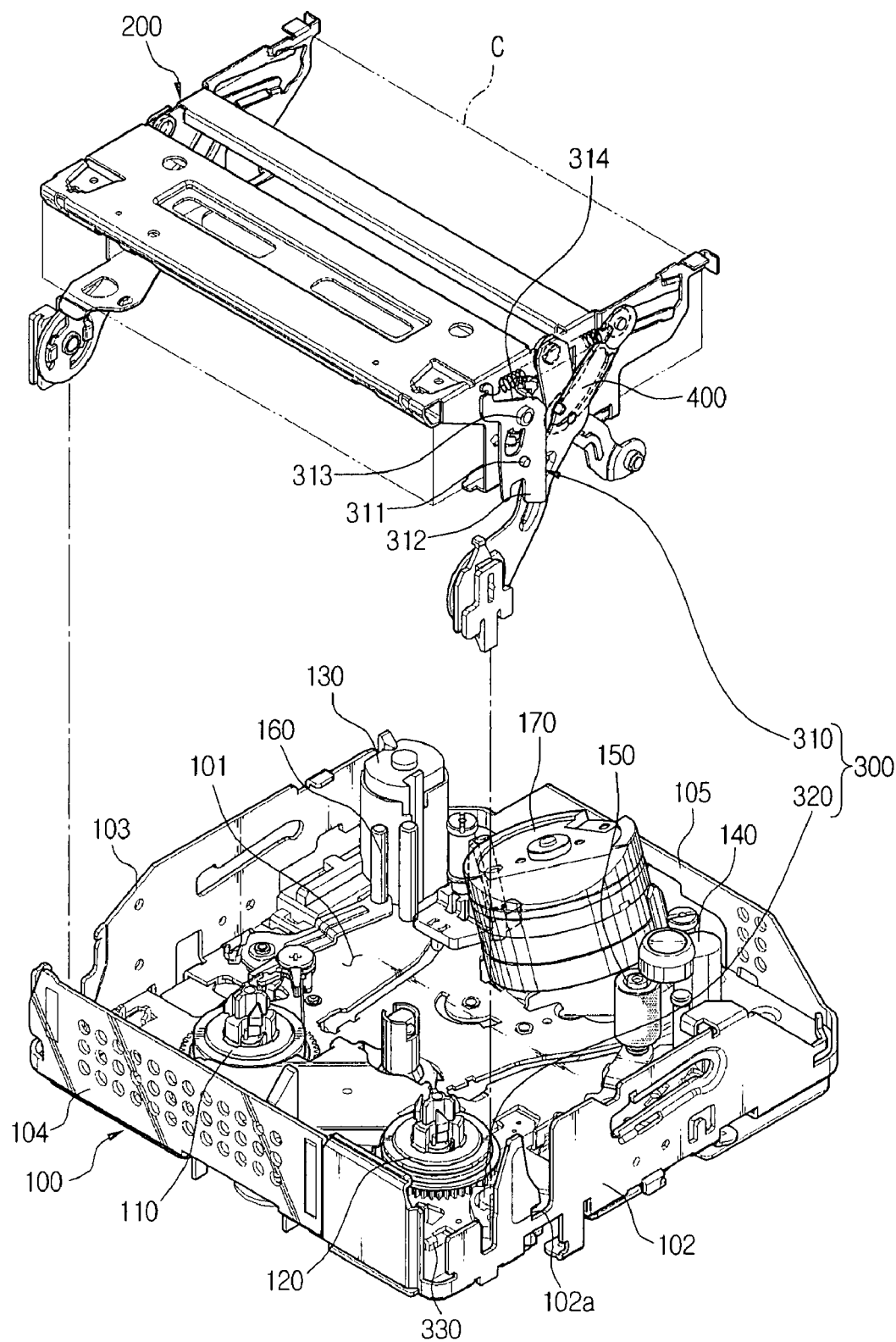
FIG. 3 is a perspective view of a deck of a magnetic recording/reproducing apparatus using a cassette tape ejecting apparatus in accordance with an embodiment of the present invention.

FIG. 3 is a perspective view of a deck of the magnetic recording/reproducing apparatus using the cassette tape ejecting apparatus in accordance with an embodiment of the present invention. Reference numeral 100 denotes a chassis, 200 denotes a cassette housing, and 300 denotes the cassette tape ejecting apparatus.

The chassis 100 has a base surface 101 and four sides 102, 103, 104 and 105 are preferably curved vertically to the edges of the base surface 101. The chassis 100 houses and supports a pair of reel tables 110 and 120 for rotatably driving tape reels (not shown) of a cassette tape C, a loading motor 130, a capstan motor 140, a plurality of guide rollers 150 and guide poles 160 composing a tape running system, and a head drum assembly 170.

The cassette housing 200 is installed on the chassis 100 to be transferred to a tape insertion position and a tape ejection position by an X lever 400. The cassette tape C is mounted on the cassette housing 200. Therefore, the cassette tape C can be stably positioned on the reel tables 110 and 120 of the chassis 100.

The cassette tape ejecting apparatus 300 locks the cassette housing 200 on the chassis 100 when the cassette housing 200 is transferred to the tape insertion position, and unlocks the cassette housing 200 and transfers the cassette housing 200 to the tape ejection position to eject the cassette tape C.

As shown in FIGS. 3 to 6, the cassette tape ejecting apparatus 300 comprises the chassis 100 having a pin boss 101a, a hook hole 101b and a locking groove 102a which are formed as a single body, a locking lever 310 installed on the cassette housing 200, an eject lever 320 installed on the chassis 100, and a cassette switch 330.

Figure 4:
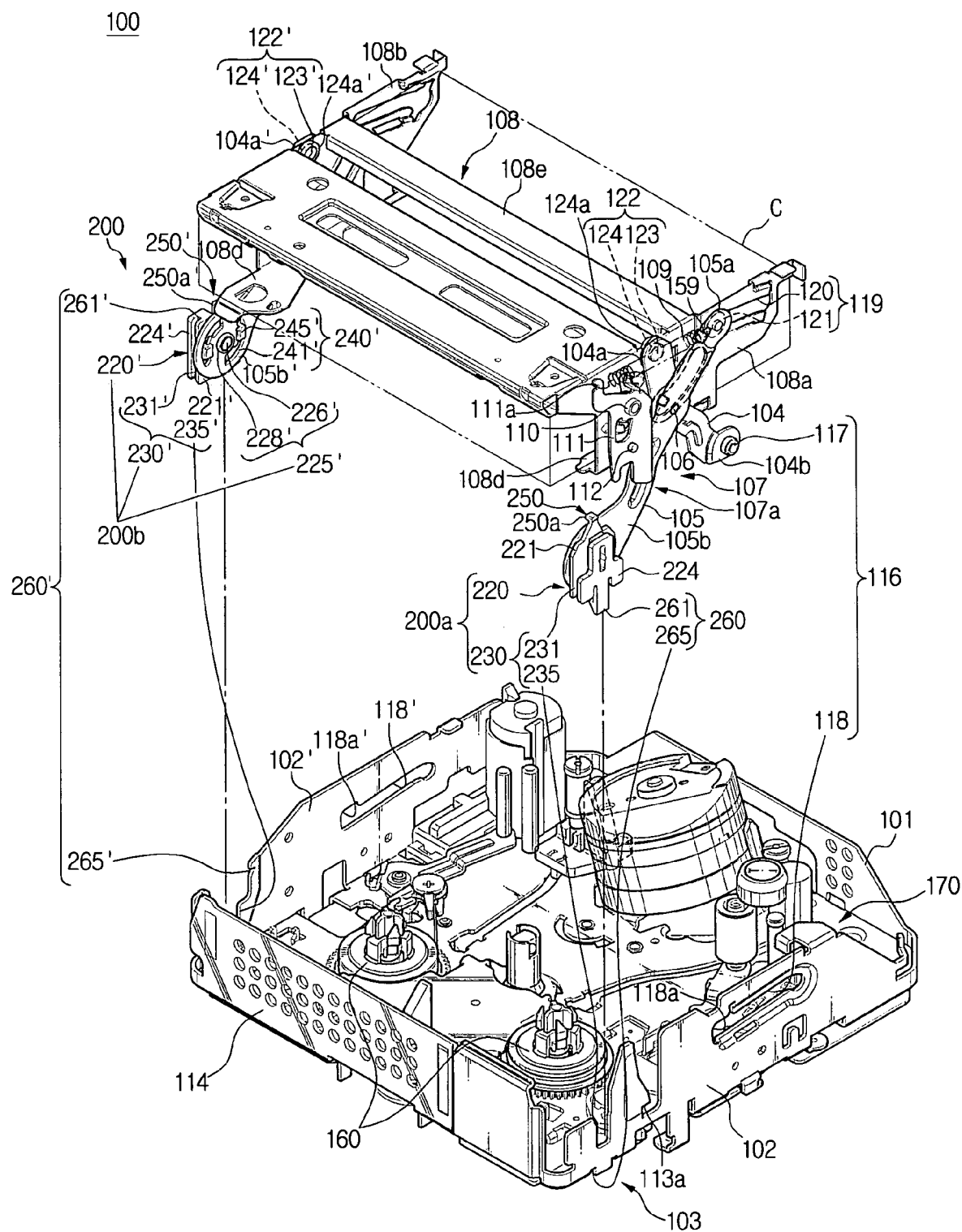
FIG. 4 is an exploded perspective view of the cassette tape ejecting apparatus in accordance with an embodiment of the present invention.
Figure 5:
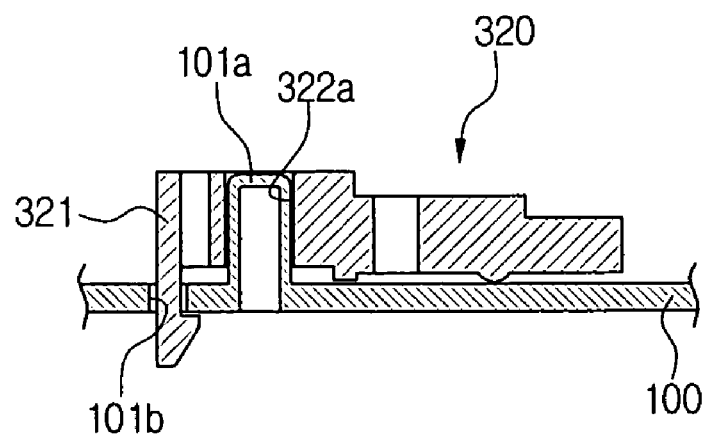
FIG. 5 is an assembly cross-sectional view of FIG. 4.

As depicted in FIGS. 4 and 5, the pin boss 101a is incorporated with the chassis 100 by deep-drawing. The eject lever 320 is rotated around the pin boss 101a in the forward/backward direction at a predetermined angle. The hook hole 101b is preferably formed on the chassis 100 adjacently to the pin boss 101a. The locking groove 102a is formed on one side 102 of the chassis 100. The hook hole 101b and the locking groove 102a will be explained later in more detail.

The locking lever 310 has a locking protrusion 311 hooked on the locking groove 102a when the cassette housing 200 is transferred to the tape insertion position, and an unlocking protrusion 312 contacting the eject lever 320 which will be explained later in more detail. The locking lever 310 is installed on the cassette housing 200 to be rotated on an axis 313 so that the locking protrusion 311 can be elastically biased in the direction of insertion into the locking groove 102a preferably by a spring 314.

As mentioned above, the eject lever 320 is installed on the chassis 100 to be rotated about the pin boss 101a in the forward/backward direction at a predetermined angle. In accordance with an embodiment of the present invention, the eject lever 320 comprises a hook portion 321 hooked on the hook hole 101b of the chassis 100 to prevent separation of the chassis 100. Therefore, the eject lever 320 can be coupled to the chassis 100 to be fully operated, without using subsidiary materials, such as a pin or a washer.

Figure 6:
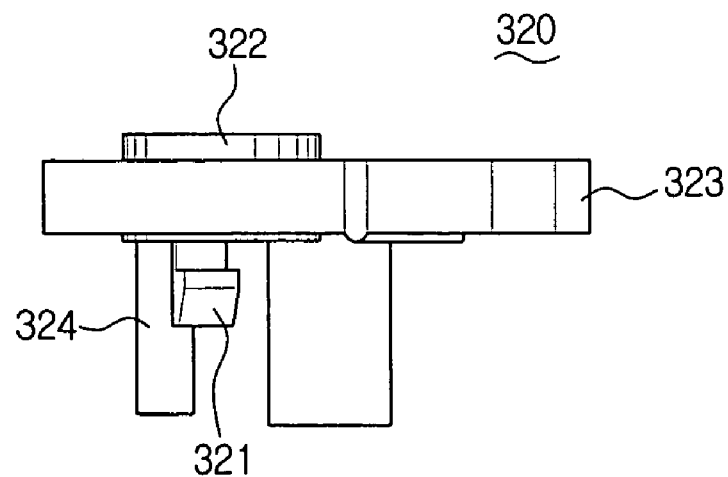
FIG. 6 is a front view of an eject lever of the cassette tape ejecting apparatus in accordance with an embodiment of the present invention.

The eject lever 320 comprises a body 322 having a pin hole 322a for housing the pin boss 101a of the chassis 100, an operation portion 323 and a pressing portion 324. The operation portion 323 contacts the unlocking protrusion 312 of the locking lever 310, and the pressing portion 324 controls a contact point 331 of the cassette switch 330 which will be described later in more detail. In the eject lever 320 as shown in FIG. 6, the pressing portion 324 is elastically formed on the body 322. Even if an excessive external force is applied to the eject lever 320, the pressing portion 324 buffers the force and efficiently operates the contact point 331 (as shown in FIG. 4) of the cassette switch 330.

As described above, the cassette switch 330 is turned on/off by the forward/backward rotation of the eject lever 320, for providing locking state and unlocking state signals of the cassette housing 200 to a control portion (not shown).

Preferably, the cassette switch 330 is installed on the bottom surface of the chassis 100 to efficiently use the inside space of the chassis 100.

In accordance with an embodiment of the present invention, in the cassette tape ejecting apparatus of the magnetic recording/reproducing apparatus, when the cassette housing 200 on which the cassette tape C has been mounted is transferred to the tape insertion position, the cassette housing 200 is locked. In the locked state, in order to eject the cassette tape C, the eject lever 320 is rotated in the counterclockwise direction as can be seen from FIG. 4, thereby pushing the unlocking protrusion 312 of the locking lever 310. Thus, the cassette housing 200 is unlocked and transferred to the tape ejection position.

The locking and unlocking operations of the cassette housing 200 are performed in the same manner as those of the conventional apparatus. However, the cassette tape ejecting apparatus 300 can easily couple the eject lever 320 to the chassis 100 by using the pin boss 101a incorporated with the chassis 100 and the hook portion 321 formed on the eject lever 320, instead of being required to use subsidiary materials, such as a pin or a washer.

A number of assembly process steps can be reduced by decreasing a number of assembly components. That is, the process step for installing the pin on the chassis and a process for assembling the eject lever to the pin and coupling the washer onto the pin can be omitted.

As discussed earlier, in accordance with an embodiment of the present invention, the cassette tape ejecting apparatus of the magnetic recording/reproducing apparatus can couple the eject lever to the chassis to be rotated in the forward/backward direction at a predetermined angle, by using the pin boss formed on the chassis and the hook portion formed on the eject lever. That is, the cassette tape ejecting apparatus can reduce the number of the assembly components by omitting the subsidiary materials such as the pin or the washer, which results in lower costs and higher productivity.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A cassette tape ejecting apparatus of a magnetic recording/reproducing apparatus, comprising:
    a chassis having a pin boss, a hook hole and a locking groove which are formed as a single body;
    a cassette housing installed on the chassis to be transferred to a tape insertion position and a tape ejection position, a cassette tape being mounted thereon;
    a locking lever being installed on the cassette housing, and having a locking protrusion hooked on the locking groove when the cassette housing is transferred to the tape insertion position; and
    an eject lever installed on the chassis to be rotated through the pin boss in the forward/backward direction at a predetermined angle, for unlocking the locking protrusion from the locking groove to eject the cassette tape, wherein the eject lever comprises a hook portion hooked on the hook hole of the chassis, for preventing separation.

2. The apparatus as claimed in claim 1, comprising a cassette switch, which is turned on/off by the forward/backward rotation, respectively of the eject lever, for detecting the ejection of the cassette tape,
    wherein the locking lever comprises an unlocking protrusion contacting the eject lever, and the eject lever comprises a body having a pin hole for housing the pin boss, an operation portion contacting the unlocking protrusion of the locking lever, and a pressing portion for operating the cassette switch.

3. The apparatus as claimed in claim 1, wherein the pin boss is formed by deep-drawing.

4. The apparatus as claimed in claim 2, wherein the pressing portion has elasticity to the body.

5. The apparatus as claimed in claim 2, wherein the cassette switch is installed on the bottom surface of the chassis.

6. A magnetic recording/reproducing apparatus comprising:
    a chassis for supporting reel tables, a tape running system and a head drum;
    a cassette housing installed on the chassis to be transferred to a tape insertion position and a tape ejection position, a cassette tape being mounted thereon; and
    a cassette tape ejecting apparatus for locking the cassette housing on the chassis when the cassette housing is transferred to the tape insertion position, and unlocking the cassette housing and transferring the cassette housing to the tape ejection position to eject the cassette tape,
    wherein the cassette tape ejecting apparatus comprises:
    a pin boss, a hook hole and a locking groove which are formed as a single body with the chassis;
    a locking lever being installed on the cassette housing, and having a locking protrusion hooked on the locking groove when the cassette housing is transferred to the tape insertion position, and an unlocking protrusion;
    an eject lever installed on the chassis to be rotated through the pin boss in the forward/backward direction at a predetermined angle, for unlocking the locking protrusion from the locking groove to eject the cassette tape, wherein the eject lever comprises a hook portion hooked on the hook hole of the chassis, for preventing separation; and
    a cassette switch turned on/off by the forward/backward rotation of the eject lever, for sensing ejection of the cassette tape.

7. The apparatus as claimed in claim 6, wherein the eject lever comprises a body having a pin hole for housing the pin boss, an operation portion contacting the unlocking protrusion of the locking lever, and a pressing portion for operating the cassette switch.

8. The apparatus as claimed in claim 7, wherein the pin boss is formed by deep-drawing.

9. The apparatus as claimed in claim 7, wherein the pressing portion has elasticity to the body.

10. The apparatus as claimed in claim 7, wherein the cassette switch is installed on the bottom surface of the chassis.

* * * * *